(12) United States Patent
Li et al.

(10) Patent No.: US 8,847,884 B2
(45) Date of Patent: Sep. 30, 2014

(54) ELECTRONIC DEVICE AND METHOD FOR OFFERING SERVICES ACCORDING TO USER FACIAL EXPRESSIONS

(71) Applicants: Hai-Sheng Li, Shenzhen (CN); Hui-Ling Ru, Shenzhen (CN); Rong-Feng Cheng, Shenzhen (CN); Chih-San Chiang, New Taipei (TW)

(72) Inventors: Hai-Sheng Li, Shenzhen (CN); Hui-Ling Ru, Shenzhen (CN); Rong-Feng Cheng, Shenzhen (CN); Chih-San Chiang, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 150 days.

(21) Appl. No.: 13/663,380

(22) Filed: Oct. 29, 2012

(65) Prior Publication Data

US 2013/0162524 A1 Jun. 27, 2013

(30) Foreign Application Priority Data

Dec. 26, 2011 (CN) .......................... 2011 1 0440359

(51) Int. Cl.
*G09G 5/00* (2006.01)

(52) U.S. Cl.
USPC ......................................... 345/156; 345/204

(58) Field of Classification Search
USPC .......................... 345/156, 157, 204, 690, 173
See application file for complete search history.

(56) References Cited

U.S. PATENT DOCUMENTS

2004/0001616 A1* 1/2004 Gutta et al. ................... 382/118
2011/0197201 A1* 8/2011 Yoo et al. ...................... 719/313

FOREIGN PATENT DOCUMENTS

CN 101917585 A 12/2010
CN 202025333 U 11/2011

* cited by examiner

*Primary Examiner* — Ricardo L Osorio
(74) *Attorney, Agent, or Firm* — Novak Druce Connolly Bove + Quigg LLP

(57) ABSTRACT

A method for offering services according to facial expressions is provided. The method has an electronic device storing a service database recording at least one user's information. The method activates an offering service function; captures facial expressions of the user; extracting the features of the facial expressions; compares the extracted features with the features in images of the facial expressions stored in the service database, so as to identify a corresponding feature stored in the service database, and determines the type of expression and the service corresponding thereto from images of the user stored in the service database; and activates and provides the determined service. An electronic device using the method is also provided.

14 Claims, 4 Drawing Sheets

| Images of Facial Expressions |  |  |  |  |  |  |  |
|---|---|---|---|---|---|---|---|
| Facial Expressions | Neutral | Disgust | Anger | Fear | Happiness | Sadness | Surprise |
| Services | Voice reminding service | Emotion Tension Relieving service | Humor service | Soft music service | Cheerful music service | Comfort angel service | Interactive service |

ELECTRONIC DEVICE AND METHOD FOR OFFERING SERVICES ACCORDING TO USER FACIAL EXPRESSIONS

BACKGROUND

1. Technical Field

The present disclosure relates to electronic devices and methods for offering services according to user facial expressions, and particularly, to an electronic device with a camera unit and a method for offering services corresponding to user facial expressions.

2. Description of Related Art

Electronic devices such as mobile phones, digital photo frames, electronic readers (e-readers), are popular. Users may use the electronic device when they are in different moods and when they feel different emotions. Some electronic devices can capture the expressions of the user via cameras on the body of the electronic devices, thus to analyze the mood of the user. However, the electronic device of related art fails to automatically offer different services according to different expressions on the face of the user.

Therefore, what is needed is an electronic device and a method for automatically offering services according to user expressions to avoid the limitations described above.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding sections throughout the several views.

DETAILED DESCRIPTION

Figure 1:
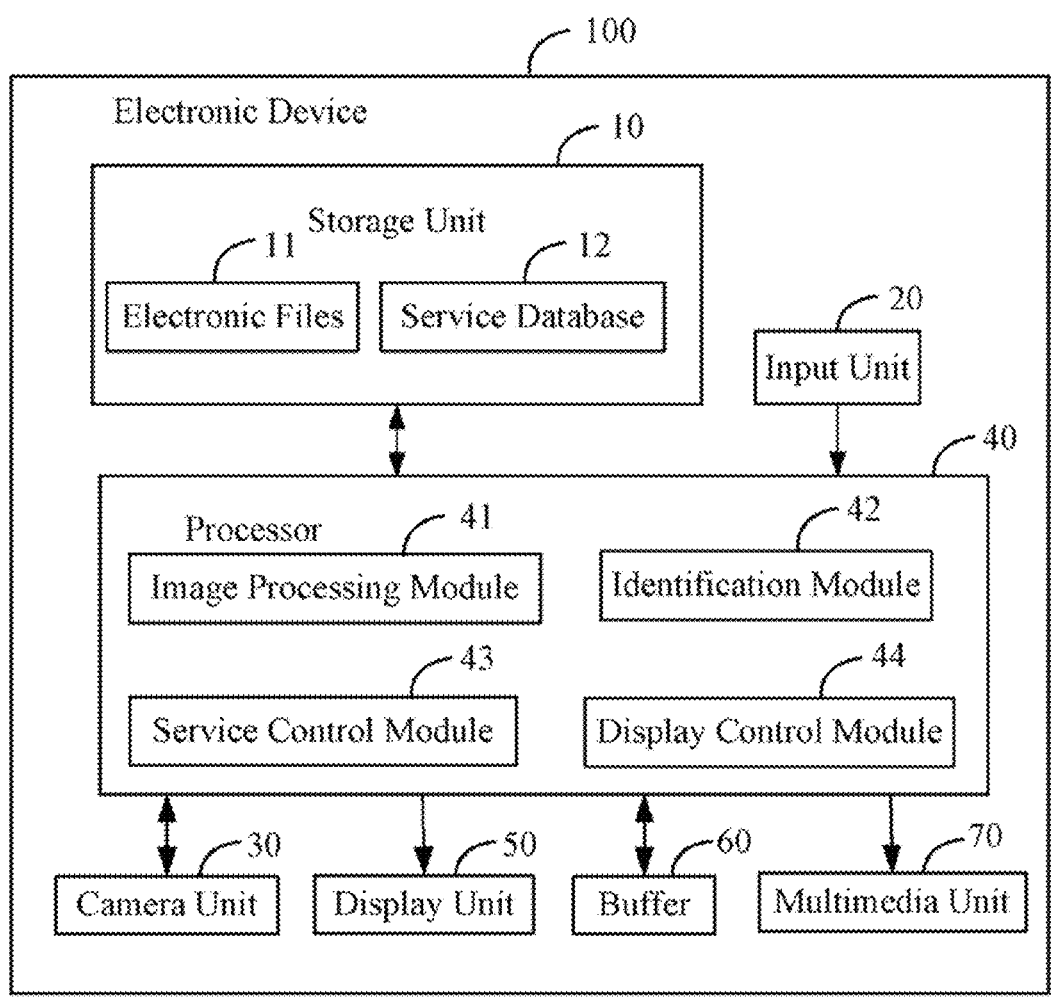
FIG. 1 is a block diagram of an electronic device in accordance with an exemplary embodiment.

FIG. 1 is an exemplary embodiment of a disclosure of an electronic device 100. The electronic device 100 provides real-time services according to the expressions on the face of the user. The electronic device 100 is a laptop with a camera unit 30. In alternative embodiments, the electronic device 100 can be other electronic devices with camera units, such as a mobile phone, an electronic reader, a tablet, a digital phone frame or the like.

The electronic device 100 includes a storage unit 10, an input unit 20, a camera unit 30, a processor 40, and a display unit 50.

The storage unit 10 stores a plurality of electronic files 11, and a service database 12 recording services for users and including at least one user's information. The electronic file 11 includes audio files, and/or video files. Each user's information includes a mapping relationship between a number of images of facial expressions on the user's face, a number of facial expressions of a user, and a number of services. The number of images is to reflect the mood of the user when the user faces the camera unit 30 of the electronic device 100. The expression on the user's face generally follows the real time mood of the user. When the user faces the camera unit 30 of the electronic device 100, a facial image of the user is captured via the camera unit 30, the features of the facial images are extracted via a navigation interface displayed on the display unit 50, and information of the user is gathered in the service database 12 stored in the storage unit 10. The user of the electronic device 100 can do a test for extracting the facial expression on his/her face via the navigation interface, and store the retrieved information of himself/herself in the service database 12.

Figure 2:
FIG. 2 is a table stored in the electronic device of FIG. 1, recording the mapping relationship between a number of images of expressions, a number of user expressions, and a number of services.
Figure 2:
Figure 2:
Figure 2:
Figure 2:
Figure 2:
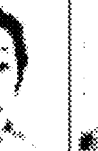
Figure 2:

The number of services can be predefined or selected by the system of the electronic device 100. Referring to FIG. 2, a table stored in the electronic device 100 is shown. In this embodiment, the table records a mapping relationship between images of seven different expressions on a user's face, seven types of facial expressions of a user, and seven kinds of computer services. For example, the services corresponding to user expressions such as neutral, disgust, anger, fear, happiness, sadness, and surprise, are respectively voice reminding service, emotional tension relieving service, humor service, soft music service, cheerful music service, comfort angel service, and interactive service.

The voice reminding service communicates audibly and vocally with the user, e.g., saying "hello, master", "dear", or "honey" or the like to the user.

The emotional tension relieving service is to open venting games for the user, to play misery voice in response to the user's scolding, etc. Thus, the user can play the games or scolds the computer for relieving his/her tension.

The humor service includes playing audio jokes, linking to a joke website, and linking to joke videos.

The soft music service is to play soft music.

The cheerful music service is to play cheerful music.

The comfort angel service includes chatting with the user, crying with the user.

The interactive service includes playing videos for interacting with the user, for example, playing games with the user via magic videos and dancing videos.

The disclosure is not to be construed as being limited hereto. Various changes or modifications may be made to the above services according to actual need.

Referring to FIG. 1, the input unit 20 is configured for generating signals in response to user's operations. For example, the user can operate the input unit to activate, and end the service, and set the service function.

The camera unit 30 captures images of the real-time facial expressions of the user facing the camera unit 30, and transmits the captured images to the processor 40. When a service is activated, the camera is simultaneously activated. In this embodiment, the camera unit 30 is a camera installed above the display unit 50. In other embodiments, the camera can be located on the left center or other positions relative to the display unit 50, as long as images of the face of the user can be captured by the camera.

The processor 40 includes an image processing module 41, an identification module 42, and a service control module 43. The image processing module 41 analyzes and processes the images of the user captured by the camera unit 30 via various image processing arithmetic, so as to extract the features of each facial expression of the user.

The identification module 42 compares the features extracted from the images of a user captured by the camera unit 30 with the features of the facial expressions in the images of the user stored in the service database 12, so as to find a corresponding feature stored in the service database 12. For example, the identification module 42 finds an identical or the most similar feature of a facial expression in the images of the user stored in the service database 12, on the basis of a comparison with any extracted feature of the real-time facial expression of the user now captured. The identification module 42 also determines and retrieves the type of the user expression and the service corresponding to the image containing the facial expression of the user from the service database 12, and transmits the retrieved information to the service control module 43.

The service control module 43 calls up the hardware and associated software required for offering the service determined by the identification module 42, for controlling the electronic device 100 to activate and offer the service for the user. In this embodiment, the service control module 43 activates the hardware and associated software required for offering the service to the user.

The electronic device 100 further includes a buffer 60 and a multimedia unit 70. The buffer 60 temporarily stores the images of the face of the user captured by the camera unit 30 and the features of the images of facial expressions of the user extracted by the image processing module 41. The multimedia unit 70 plays audio data such as music, sounds, and voices. The processor 40 further includes a display control module 44 which controls the display unit 50 to display different contents.

When the offering service function of the electronic device 100 is activated, the display control module 44 controls the display unit 50 to display an input box for the user to input his/her username. The identification module 42 retrieves the service database 12, if the user information is recognized by the identification module 42, and then the image processing module 41, the identification module 42, the service control module 43, and the display control module 44 can execute the aforementioned functions, to offer services for the user associated with the mood of the user.

If the identification module 42 fails to recognize the user input according to the user information stored in the service database 12, the electronic device 100 determines that it is the first time for the user to use the offering service function of the electronic device 100. The display control module 44 further puts out a dialog box on the display unit 50, to prompt the user whether he/she wants to do a test for extracting features of facial expressions relating to himself/herself. When the user selects to do the test, the display control module 44 displays a dialog box to prompt the user to sequentially offer different facial expressions according to the tips and advice displayed on the display unit 50. In this embodiment, the facial images captured in the test are temporarily stored in the buffer 60. The display control module 44 further displays the real-time images of facial expressions captured by the camera unit 30 on the display unit 50, so as to provide confirmation to the user. Once the user confirms the facial expression in the image and selects "OK" from the dialog box, the camera unit 30 transmits the image containing the confirmed facial expression to the image processing module 41. The image processing module 41 extracts the features of the facial expression from the images. The identification module 42 determines the types of the facial expressions of the user according to the features of the facial expression images, and stores a mapping relationship between the features and the types of facial expressions in the service database 12. The user can later activate the offering service function when the navigation test is over.

In a second embodiment, the service database 12 further records a mapping relationship of a number of facial expressions of a user, a number of audio services, and a number of video services.

The audio service adds sound effects corresponding to a user expression to a currently played audio file.

The video service is selected from the group consisting of: adding sound effects corresponding to a user expression to the currently played video files, adjusting the color of the screen according to the user expression, and adjusting the brightness value of the screen according to the user expression. For example, when the facial expression is deemed to show happiness, the corresponding audio service is selected from the group consisting of: adding cheerful background sound to the currently played audio file, and speeding up the playing speed of the currently played audio file. The video service which is corresponding is selected from the group consisting of: adding cheerful background sound to the currently played video file, speeding up the playing speed of the currently played video file, adjusting the color of the screen to make more vivid, and increasing the brightness value of the screen.

When the offering service function is activated, and the electronic device is playing an audio or video file, the identification module 42 determines the user's mood and the audio service or video service which correspond thereto according to the features of the facial expression extracted by the image processing module 41 and the service database 12. The service control module 43 adjusts the currently played audio file or video file according to the type of the service. The multimedia unit 70 plays the adjusted audio file or video file.

Figure 3:
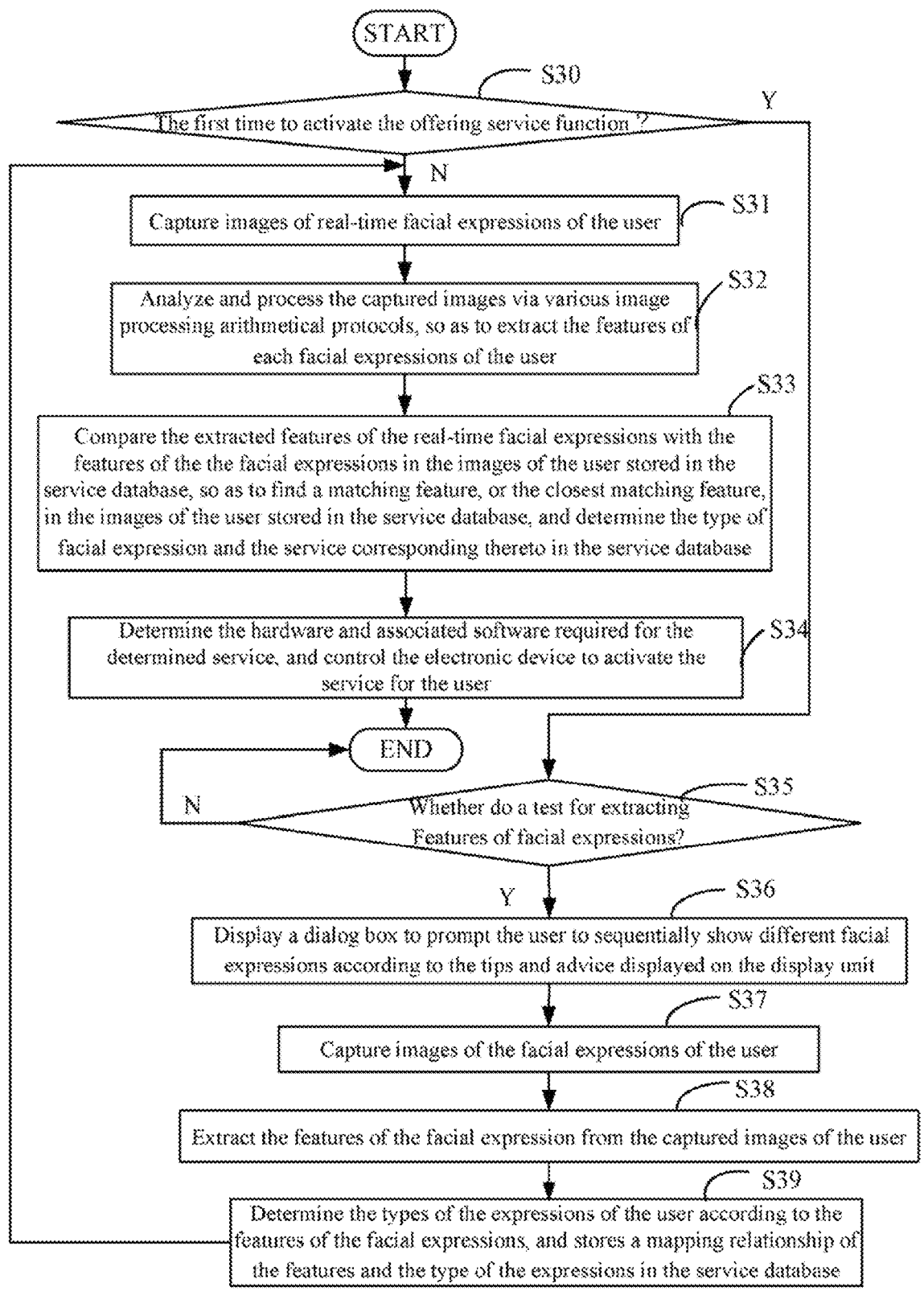
FIG. 3 is a flowchart of a method for offering services according to user facial expressions for electronic devices, such as the one of FIG. 1, in accordance with an embodiment.

FIG. 3 shows a flowchart of a method for offering service according to user facial expressions, in accordance with a first embodiment of the electronic device 100. The electronic device 100 stores a service database recording services for users and including at least one user's information. Each user's information includes a mapping relationship between a number of images of features of facial expressions on the user's face, a number of facial expressions of a user, and a number of services. The method includes the following steps, each of which is related to the various components contained in the electronic device 100.

In step S30, the electronic device 100 activates the offering service function in response to a user's operation, the identifying module 42 determines whether it is the first time for the user to activate the offering service function, if yes the process goes to step S31, otherwise, the processor goes to step S35.

In step S31, the camera unit 30 captures images of real-time facial expressions of the user.

In step S32, the image processing module 41 analyzes and processes the captured images via various image processing arithmetical protocols, so as to extract the features of each facial expression of the user.

In step S33, the identification module 42 compares the extracted features of the real-time facial expressions with the features of the facial expressions in the images of the user stored in the service database 12, so as to find a matching feature, or the closest matching feature, in the images of the user stored in the service database 12, and determines the type of facial expression and the service corresponding thereto in the service database 12.

In step S34, the service control module 43 determines the hardware and associated software required for the service determined by the identification module 42, and controls the electronic device 100 to activate the service for the user. In this embodiment, the service control module 43 activates the hardware and associated software required for the service, and controls any hardware to perform the service to the user.

In step S35, if it is the first time for the user to activate the offering service function, the identification module 42 offers an option for the user to a test for extracting features of facial expressions, if yes, (the option is taken), the processor goes to step S36, otherwise, the process ends.

In step S36, the display control module 44 displays a dialog box on the display unit 50 to prompt the user to sequentially show different facial expressions according to the tips and advice displayed on the display unit 50.

In step S37, the camera unit 30 captures images of the facial expressions of the user, and transmits the captured images to the image processing module 41.

In step S38, the image processing module 41 extracts the features of the facial expression from the captured images of the user.

In step S39, the identification module 42 determines the types of the expressions of the user according to the features of the facial expressions, and stores a mapping relationship of the features and the type of the expressions in the service database 12. The process goes back to step S31 when the test is over.

Figure 4:
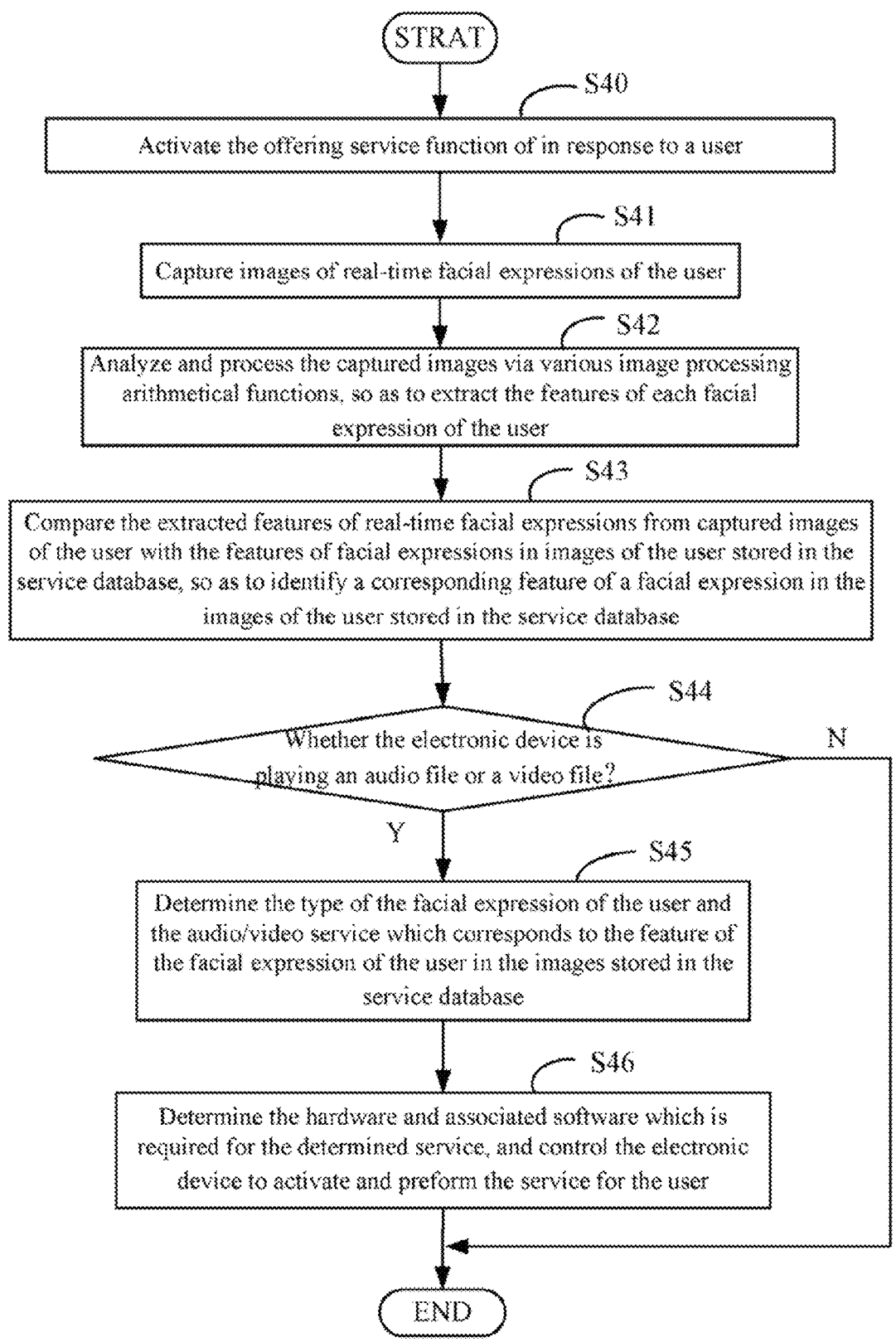
FIG. 4 is a flowchart of a method for offering services according to user facial expressions for electronic devices, such as the one of FIG. 1, in accordance with another embodiment.

FIG. 4 shows a flowchart of a method for offering services according to the facial expressions of a user, in accordance with a second embodiment of the electronic device 100. The electronic device 100 stores a service database recording services for users and including at least one user's information. Each user's information includes a mapping relationship between a number of images of facial expressions on the user's face, a number of facial expressions of a user, and a number of audio and/or video services. The method includes the following steps, each of which is related to the various components contained in the electronic device 100.

In step 40, the electronic device 100 activates the offering service function of in response to a user.

In step S41, the camera unit 30 captures images of real-time facial expressions of the user.

In step S42, the image processing module 41 analyzes and processes the captured images via various image processing arithmetical functions, so as to extract the features of each facial expression of the user.

In step S43, the identification module 42 compares the extracted features of real-time facial expressions from captured images of the user with the features of facial expressions in images of the user stored in the service database 12, so as to identify a corresponding feature of a facial expression in the images of the user stored in the service database 12.

In step S44, the identification module 42 determines whether the electronic device 100 is playing an audio file or a video file, if yes, the process goes to step S45, otherwise, the process ends.

In step S45, when an audio file is being played, the identification module 42 determines the type of the facial expression of the user and the audio service which corresponds to the feature of the facial expression of the user in the images stored in the service database 12; during playback, the identification module 42 determines the type of the facial expression of a user and the video service which corresponds to that feature of the facial expression in the images of the user stored in the service database 12.

In step S46, the service control module 43 determines the hardware and associated software which is required for the service determined by the identification module 42, and controls the electronic device 100 to activate and perform the service for the user.

With such a configuration, when the display unit 50 displays the interface for offering services, images of the facial expressions of the user facing the electronic device 100 are captured. The features of each facial expression are extracted, and the types of facial expressions and the services corresponding thereto are found from the service database. Thus, the electronic device 100 provides services corresponding to the user's real-time mood. An "as-required" service for helping to adjust or enhance the mood of the user is provided by the electronic device 100.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A method for offering services according to user facial expressions, the method being used for an electronic device storing a service database recording services for users and including at least one user's information, each user's information comprising a mapping relationship between a plurality of images of facial expressions on the user, a plurality of facial expressions of the user, and a plurality of services, the method comprising:

activating an offering service function of the electronic device;

capturing images of real-time facial expressions of the user;

extracting the features of each facial expression of the user;

comparing the extracted features of the real-time facial expressions with the features of the facial expressions in the images of the user stored in the service database, so as to find a matching feature or the closest matching feature in the images of the user stored in the service database, and determining the type of the facial expression and the service corresponding thereto in the service database; and activating and providing the determined service.

2. The method as described in claim 1, further comprising:
storing the captured images of the face of the user in a buffer; and
determining the hardware and associated software required for the determined service.

3. The method as described in claim 1, further comprising:
determining whether an audio file is being played; and
determining the type of the facial expression of the user and the audio service which corresponds to the feature of the facial expression of the user in the images stored in the service database, when an audio file is being played.

4. The method as described in claim 3, wherein the audio service is to add sound effects corresponding to a user expression to a currently played audio file.

5. The method as described in claim 1, further comprising:
determining whether a video file is being played; and
determining the type of the facial expression of the user and the video service which corresponds to the feature of the facial expression of the user in the images stored in the service database, when an video file is being played.

6. The method as described in claim 5, wherein the video service is selected from the group consisting of: adding sound effects corresponding to a user expression to the currently played video files, adjusting the color of the screen according to the user expression, and adjusting the brightness value of the screen according to the user expression.

7. The method as described in claim 1, further comprising:
determining whether it is the first time for the user to activate the offering service function;

determining whether the user selects to perform a test for extracting features of the facial expressions if it is the first time for the user to activate the offering service function;

capturing the images of the facial expressions of the user when the user selects to perform the test;

extracting the features of the facial expression from the captured images of the user;

determining the types of the expressions of the user according to the features of the facial expressions; and storing a mapping relationship between the features and the type of the expressions in the service database.

8. An electronic device, comprising:

a storage unit, storing a service database recording services for users and including at least one user's information, each user's information comprising a mapping relationship between a plurality of images of facial expressions on the user's face, a plurality of facial expressions of the user, and a plurality of services;

an input unit, configured for activating an offering service function of the electronic device in response to a user's operation;

a camera unit, configured for capturing the images of real-time facial expressions of the user;

an image processing module, configured for extracting the features of each facial expressions of the user;

an identification module, configured for comparing the extracted features of the real-time facial expressions with the features of the facial expressions in the images of the user stored in the service database, so as to find a matching feature or the closest matching feature in the images of the user stored in the service database, and determining the type of the facial expression and the service corresponding thereto in the service database; and a service control module, configured for activating and providing the determined service.

9. The electronic device as described in claim 8, wherein the camera unit is further configured for storing the captured images of the face of the user in a buffer of the electronic device, and the service control module is further configured for determining the hardware and associated software required for the determined service.

10. The electronic device as described in claim 8, wherein the identification module is further configured for determining whether an audio file is being played, and determining the type of the facial expression of the user and the audio service which corresponds to the feature of the facial expression of the user in the images stored in the service database, when an audio file is being played.

11. The electronic device as described in claim 10, wherein the audio service is to add sound effects corresponding to a user expression to a currently played audio file.

12. The electronic device as described in claim 8, wherein the identification module is further configured for determining whether a video file is being played; and determining the type of the facial expression of the user and the video service which corresponds to the feature of the facial expression of the user in the images stored in the service database, when an video file is being played.

13. The electronic device as described in claim 12, wherein the video service is selected from the group consisting of: adding sound effects corresponding to a user expression to a currently played video files, adjusting the color of the screen according to the user expression, and adjusting the brightness value of the screen according to the user expression.

14. The electronic device as described in claim 8, wherein the identification module is further configured for:

determining whether it is the first time for the user to activate the offering service function;

determining whether the user selects to perform a test for extracting features of the facial expressions if it is the first time for the user to activate the offering service function;

determining the types of the expressions of the user according to the features of the facial expressions; and storing a mapping relationship between the features and the type of the expressions in the service database.

* * * * *